Figure 1:
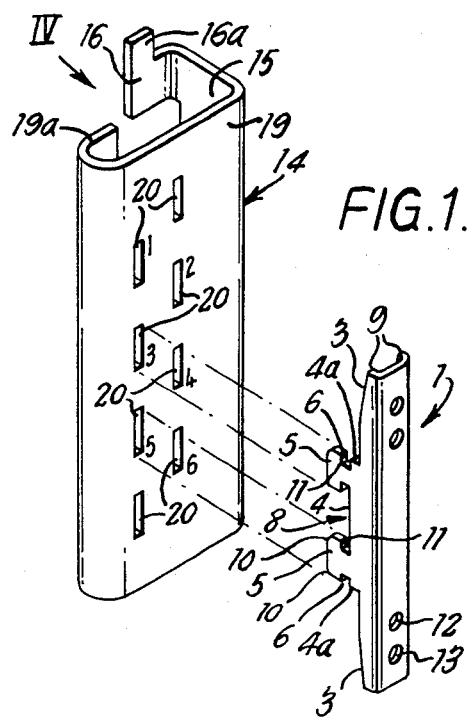

United States Patent [19]

Robilliard et al.

[11] Patent Number: 4,515,494
[45] Date of Patent: May 7, 1985

[54] FRAMEWORK CONNECTION MEANS

[76] Inventors: Leonard T. Robilliard, 13, Brickfield Ave., Leverstock Green; Alan R. Hewitt, 26, Crossways, Leverstock Green, both of Hemel Hempstead, Hertfordshire, England

[21] Appl. No.: 369,876

[22] Filed: Apr. 19, 1982
(Under 37 CFR 1.47)

[30] Foreign Application Priority Data

Apr. 22, 1981 [GB] United Kingdom ................. 8112487

[51] Int. Cl.³ ............................................... F16B 7/00
[52] U.S. Cl. .................................... 403/187; 211/187; 211/190; 248/243
[58] Field of Search ............... 211/191, 187, 208, 190; 403/254, 255, 188, 189, 190, 187; 248/243

[56] References Cited

U.S. PATENT DOCUMENTS

| | | | |
|---|---|---|---|
| 2,261,956 | 11/1941 | Brownlie et al. | 248/243 |
| 2,959,294 | 11/1960 | Rosenquist et al. | 211/208 X |
| 3,575,299 | 4/1971 | O'Dette | 248/243 X |
| 4,027,453 | 6/1977 | Bridge | 403/353 |
| 4,117,938 | 10/1978 | Klein | 211/191 |
| 4,342,397 | 8/1982 | Halstrick | 403/187 |
| 4,453,641 | 6/1984 | Rasmussen et al. | 211/187 X |

FOREIGN PATENT DOCUMENTS 404544 7/1966 Switzerland .

Primary Examiner—Richard J. Scanlan, Jr.
Attorney, Agent, or Firm—Pollock, Vande Sande and Priddy

[57] ABSTRACT

Connection means for the attachment to a framework upright member of another framework member by means of a clip device comprises a bracket separate from the upright member and provided with hook formations by which it can be detachably engaged with openings in the said upright member and with vertical series of slots which are selectively engageable by parts of the clip device, which formations and series of slots are so disposed as to be mutually unobstructive. The formations and series of slots may be provided, respectively, on and in wall parts of the bracket which are at right angles to each other. Thus the hook formations may extend parallel to the wall part in which the slots are provided, but are not located opposite to those slots. The wall part in which the slots are provided may have a distancing abutment in the form of a return flange. The hook formations may be flat and include at least one with a downwardly directed tongue. The formations may comprise hooks of downwardly tapered or narrowed shape engageable with a wedging action or may be hook studs.

3 Claims, 23 Drawing Figures

U.S. Patent  May 7, 1985  Sheet 1 of 6  4,515,494

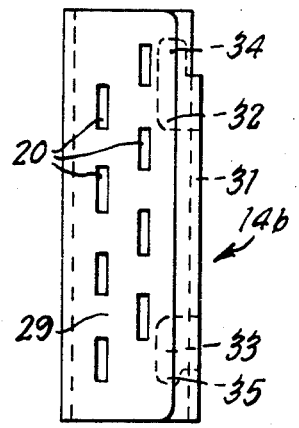
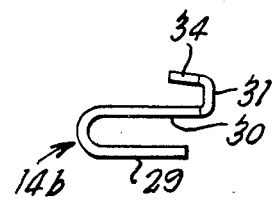
FIG.8.   FIG.9.
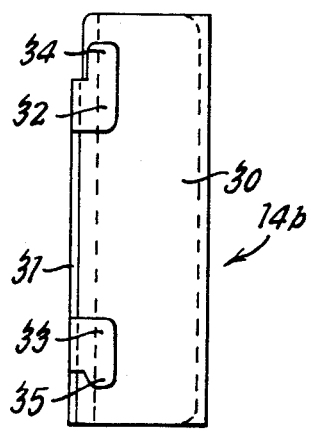
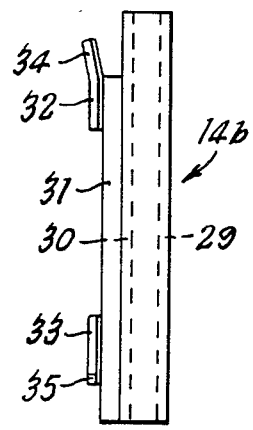
FIG.10.   FIG.11.

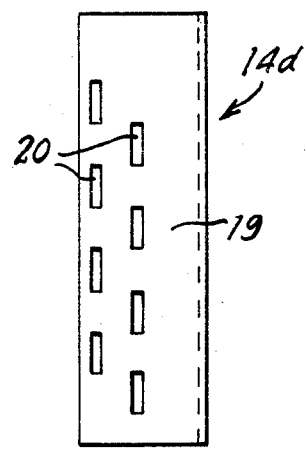
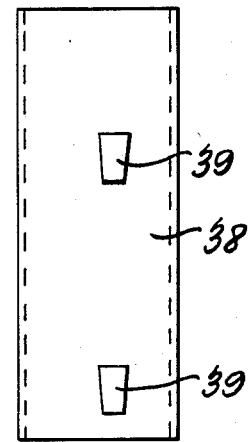
FIG.16.     FIG.17.
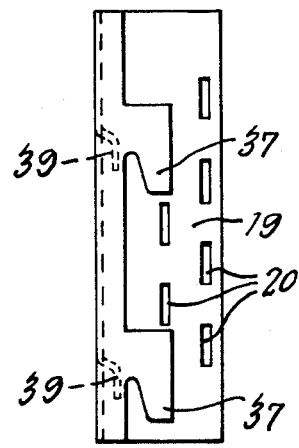
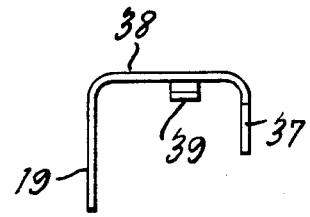
FIG.18.     FIG.19.

FRAMEWORK CONNECTION MEANS

This invention concerns improvements relating to connection means for the attachment, to framework uprights, of other framework members, particularly such members extending horizontally or at a small angle to the horizontal.

The invention is especially concerned with improvements applicable to frameworks of gravity-feed storage and delivery systems such as are disclosed in the Specifications of European Patent Applications Nos. 81301375.230 and 81103753.0 (nominating the United Kingdom) which claim the priorities of U.S. application Ser. No. 136,396, abandoned, and Ser. No. 163,342, U.S. Pat. No. 4,372,451, both in the names of Georg E. Rasmussen and Lucius B. Donkle, Jr. and assigned to Interlake Inc.

U.S. application Ser. No. 136,396 relates to a mounting clip for use in a gravity-feed merchandise storage and delivery rack for connecting a shelf frame side rail to an upstanding support column having a vertical wall with a plurality of longitudinally spaced-apart apertures therein, said mounting clip comprising an elongated channel-shaped body including a main wall and two side walls respectively projecting from the opposite side edges of said main wall and extending substantially the entire length thereof, prongs projecting from said walls away from said main wall and receivable in selected ones of the apertures in an associated support column to secure said body in a mounted configuration on the support column, bearing surfaces on said side walls engageable with the vertical wall of the associated support column for limiting the depth of insertion of said prongs and cooperating therewith rigidly to hold said body in position on the support column, each of said side walls having a retaining surface thereon extending from one end thereof toward the corresponding bearing surface, and each of said side walls having a support surface thereon extending between said bearing surface and said retaining surface thereof, said retaining surfaces cooperating with the vertical wall of the associated support column, when said body is disposed in the mounted configuration thereon, to form a notch for receiving therein the lower end of the associated shelf frame side rail for engagement with said support surfaces and support thereon.

U.S. application Ser. No. 163,342 discloses a storage shelf for use in a gravity-feed merchandise storage and delivery rack comprising two spaced-apart side frame members interconnected by front and rear frame members, merchandise support tracks mounted between said front and rear frame members and defining parallel rows of merchandise, a cross frame member interconnecting said side frame members between said front and rear frame members and below said support tracks, an intermediate guide member mounted between said front and rear frame members and upon said cross frame member and separating adjacent rows of merchandise from each other, and attachment structure readily removably interconnecting said intermediate guide member and said cross frame member to prevent lateral displacement between said intermediate guide member and said cross frame member as a result of contact with merchandise while permitting quick adjustment of the position therebetween with access only to the ends of said intermediate guide member. The use of the mounting clips referred to in the preceding paragraph in connection with the storage shelves is also disclosed in specification Ser. No. 163,342.

It is an object of the present invention to provide connection means, particularly but not exclusively for frameworks of roller beds for gravity-feed storage and delivery systems, which is versatile in use in that it permits of the use of a single kind of clip in conjunction with any of a plurality of different uprights.

According to the present invention, connection means for the attachment, to a framework upright, of another member by means of a clip device comprises a bracket, separate from the said upright and other member, which is provided with hook formations by which it can be detachably engaged with slots in the upright and with vertical series of slots detachably engageable by formations on the clip device, which is adapted for supporting the said other member, the said slots in the bracket and the said hook formations thereon being so located in relation to each other as to avoid mutual interference between the respective engagement means in use. Advantageously the slots of two said vertical series are staggered in relation to each other for receiving tongues, which are also staggered in relation to each other on the clip device.

Such connection means, in addition to affording a wide range of adjustment of the level of the said other member and, in the case of a roller bed, fine control of its inclination, achieves significant other practical advantages in that a variety of uprights can be employed, for example standard uprights, without the need for perforating them specially for the purpose. If modification is required, only the form of bracket, which in itself may in any case be simple to produce, need be modified.

Figure 2:
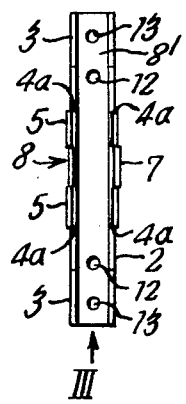
Figure 3:
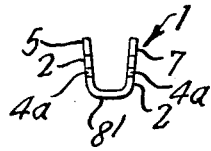
Figure 4:
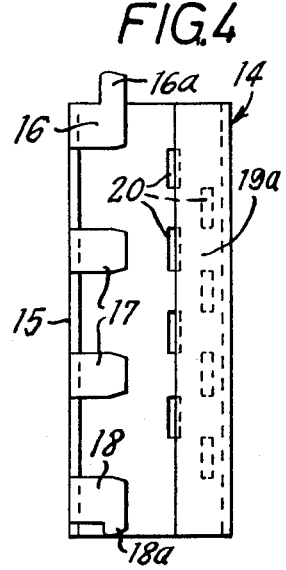
Figure 7:
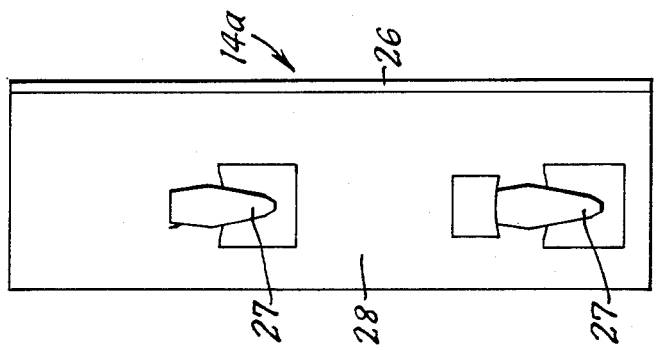
Figure 6:
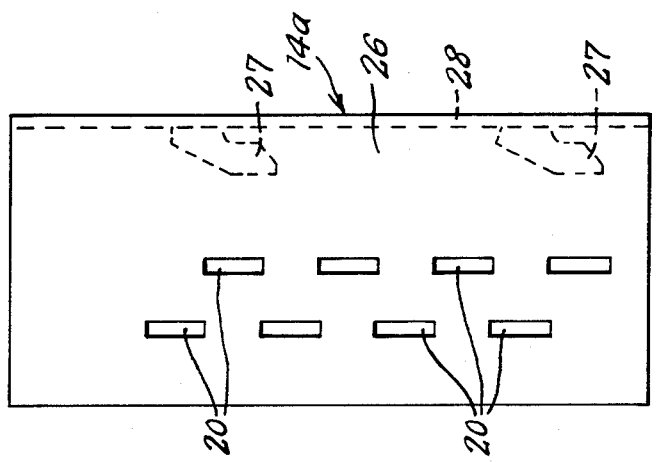
Figure 5:
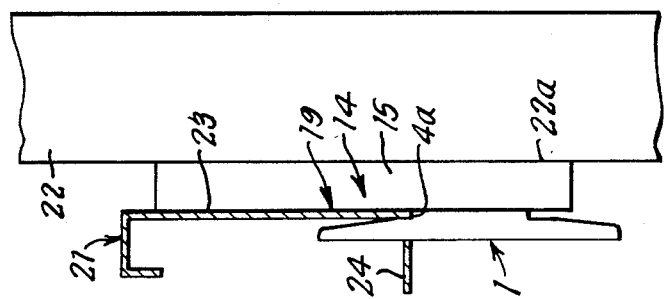
Figure 12:
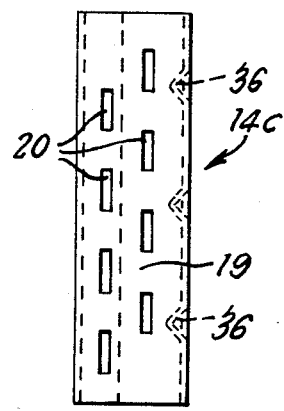
Figure 13:
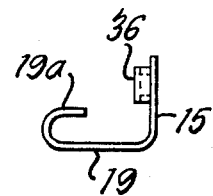
Figure 14:
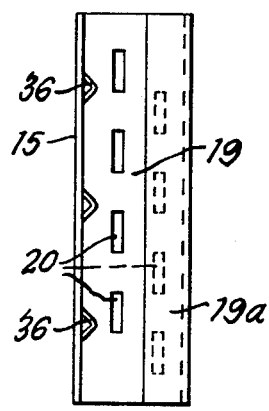
Figure 15:
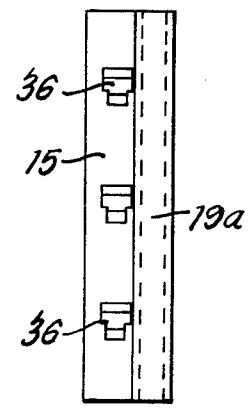
Figure 20:
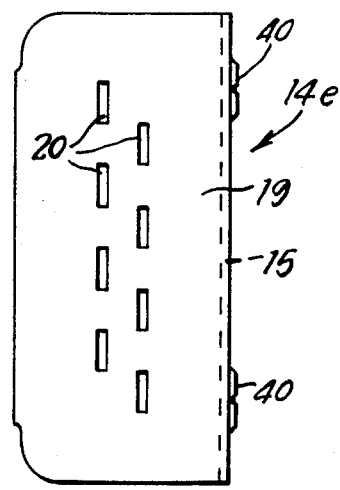
Figure 21:
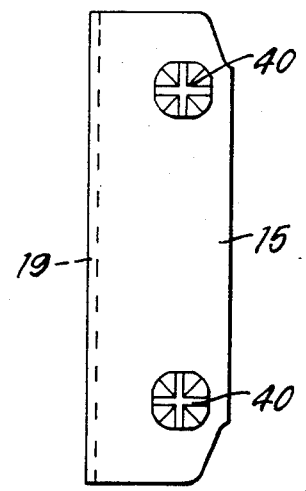
Figure 22:
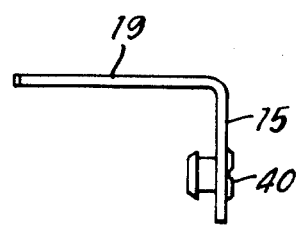
Figure 23:
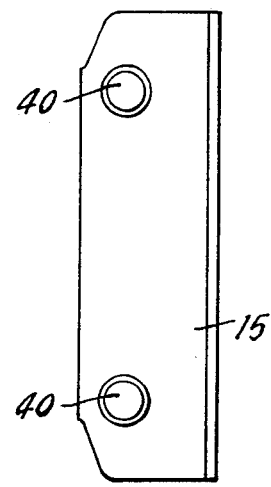

Ways of carrying the invention into effect will now be more fully described by way of example with reference to the accompanying drawings, in which:

FIG. 1 is an exploded perspective view of a clip together with one form of bracket, FIG. 2 a rear elevation of the clip alone, FIG. 3 an end view of the clip and FIG. 4 an elevation of the bracket alone, as seen in the direction of the arrow IV in FIG. 1, FIG. 5 is a diagrammatic view, partially in section, illustrating a mode of mounting another member on an upright member by means of a said clip and bracket, FIGS. 6 and 7 are front and side views of a second bracket, FIGS. 8 to 11 are respectively a front view, plan, other side view and rear view of a third form of bracket, and FIGS. 12 to 15, FIGS. 16 to 19 and FIGS. 20 to 23 are similar views for three other forms of bracket.

The mounting clip 1 illustrated by FIGS. 1 to 3 is generally similar to the clip disclosed in the above-mentioned U.S. and European specifications. It is of a channel section with side flanges 2 having end portions 3 which, at least in part, taper in depth towards the extremities. Between the end portions of each flange there is a middle portion 4 of greater depth, so that shoulders are formed at 4a between the end portions and the said deeper middle portion. On one flange 2, the portion 4 is formed towards its ends with rearwardly projecting tongues or prongs 5 of T-shape with notches 6 (FIG. 1) between the edge of the said flange portion and the head of the T-shape. The other flange is formed with a single tongue or prong 7 (FIG. 2) of the same shape located at the mid length of the flange portion 4, that is transversely opposite to the gap 8 between the two tongues 5 of the first mentioned flange. Apart from the locations of the tongues 5, 7, the clip is of symmetrical shape. The transition between each flange 2 and the web 8' is radiused and the flanges 2 may be slightly splayed (FIG. 3). The end corners 9 of the flanges 2 and the corners 10 of the heads of the tongues 4 are preferably radiused and the undersides 11 of the said heads slightly bevelled (FIG. 1) so that the notches 6 flare slightly outwardly.

The web 8' may be provided, as shown, with a pair of round holes 12, 13 for anti-tip screws, or with a single hole 12 towards each end.

The bracket 14 (FIGS. 1 and 4) whose cross section is seen in FIG. 1 is provided on one flange 15 with a plurality of equally spaced flat tongues 16, 17 and 18 for engagement in selected elongate, vertical slots of vertical series thereof provided in a wall, to which the flange 15 is parallel when in the engaged position of an upright (not shown). The uppermost tongue 16 has an upwardly extending hook portion 16a and the lowest tongue 18 a shorter, downwardly extending, hook portion 18a. Intermediate tongues 17 are plain (FIG. 4). The bracket 14 illustrated is for use to one side of an upright. For the other side, a bracket of opposite hand would be employed. To enable the tongues 16 to 18 of brackets of both hands to be accommodated, two vertical series of slots or a single series of wider slots may be provided.

The front, web, portion 19 of the bracket 14 is provided with two vertical series of vertically elongated slots 20 which are equally spaced transversely at the same interval as the tongues 5 on the clip 1, but with the slots in the one series symmetrically staggered in relation to those of the other series. The slots 20 and the transverse spacing are dimensioned to accommodate the tongues 5, 7. For ease of use, the slots are identified by numerals embossed in the face of the web 19 (FIG. 1). To the side of the bracket 14 remote from the flange 15, the web 19 is formed with a return flange 19a. Because of the distancing effect of the return flange 19a which serves to abut against part of the upright in use of the bracket, and the relative dispositions of the slots 20 and tongues 16 to 18, each can serve its function without obstruction to or interference with the function of the others.

For attaching a clip 1 to a bracket 14, the tongues 5 and 7 of the former are entered into selected combinations of slots 20 and the clip is moved downwardly so that the lower notches 6 hook firmly over the lower-end edges of respective slots. For example, with the clip 1 and bracket 14 in the relative positions indicated in FIG. 1, movement of the former towards the latter would enter the pair of tongues 5 into the slots 20 with the embossed numbers 3 and 5, while the single tongue 7 would enter the slot numbered 4. By selecting the slots 20 used and employing the clip 1 in either the position shown in FIG. 1 or in an inverted position, the clip can be attached in a range of vertical positions at intervals of, say, approximately 13 mm, the maximum range of adjustment then being about 80 mm.

One example of how another member 21, for example a side member of the roller bed of a gravity-feed storage structure or of a shelf structure can be mounted on an upright 22 by the use of the components described above is illustrated in outline only in FIG. 5. A clip 1 is shown mounted on a bracket 14 which in turn is attached to the upright 22. The member 21 in this example is a side channel disposed on edge and is mounted on the clip 1 with its vertical web 23 engaged inside the upper portion of the channel section clip in which it rests, in a basic setting, on the upper shoulders 4a of the clip. With the channel-section member 21 shown, the upper portion of the clip will pass through a selected one specific slot of an equally spaced series provided along the lower flange 24 of the member. Instead of a channel-section member 21, use could be made of a simple angle-section member with no bottom flange 24.

Another form of a bracket 14a (FIGS. 6 and 7) with which the same clip 1 can be used in the manner previously described is of angle section with the same number and pattern of slots 20 in its flange 26 and inwardly directed hook formations 27, formed from its other flange 28, which can be engaged with selected complementary slots in a wall of the upright, to which the flange 28 extends parallel. A bracket 14a can thus be adjustably mounted on the upright. As will be appreciated for FIG. 7 in particular, there will, in this case also, be no functional interference in use between tongues 5, 7 entered in slots 20 and hook formations 27.

A third form of bracket 14b (FIGS. 8 to 11) with which the clip 1 can also be used is of a generally U-shaped section (FIG. 9) with the slots 20 formed in the front shank 29 of the section (FIG. 8). The other shank 30 has a rearward extension 31 with return portions forming laterally projecting tongues 32, 33. These have upward and downward flat-hook formations 34, 35 respectively by which the bracket can be engaged with selected complementary slots of vertical series in a box-section upright and can be mounted on the latter. The hook formation 34 (FIG. 11) is bent slightly rearwardly. As is evident from FIG. 8, there will be not functional interference between the slots 20 and hook formations.

The bracket 14c of FIGS. 12 to 15, in which the slots 20 are again provided in the wall 19, is similar to that of FIG. 1, except that the flange 15 is not provided with flat tongues 16 to 18 but with hook formations 36 engageable with a wedging effect by lower, narrower, portions in lower narrower portions of selected complementary slots in the upright. In this form of bracket, the hook formation may be made as a bridge piece integral with the flange 15 (see FIG. 14). The formations 36 are positioned well away from the slots 20 (FIG. 12) and a return flange 19a is provided.

In the case of the bracket 14d of FIGS. 16 to 19, mounting upon an upright is obtained by virtue of two kinds of hook formations, namely downwardly extending flat hooks 37 at the edge of a flange 38 and bent-down hooks 39 stamped inwardly from the said flange. In this case, the hooks 37 are well removed from the slots 20 by the width of the flange 38, while the hooks 39 are also well removed by reason of their location on the flange 38 (FIG. 18) and towards the side of that flange remote from the side thereof adjoining the front wall 19 (FIG. 19).

In the side of bracket 14e shown in FIGS. 20 to 23, provision in a flange 15 for connection to a box-section upright (not shown) comprises hook-studs 40 engageable in selected keyhole slots in the upright. Once again slots 20 are well removed from the studs 40.

With the above-described forms of bracket, safety locking means can be provided without difficulty for preventing displacement of one framework member in relation to another as a result of impact with the bracket or other part of the framework.

Guidance as to height levels of side members 21 (FIG. 5) may be afforded by calibrated tapes, adhered to the front face of the upright, in conjunction with a reference mark embossed in the clip. In this manner, it can be readily ensured that a roller-bed frame is supported at the same level, or with a required difference in level, at the two sides, as well as with a required decline in level along the bed.

What is claimed is:

1. Connection means for the attachment, to a framework upright member, of another framework member by means of a clip device, said connection means comprising a bracket consisting of a vertically elongated angle section separate from the upright member and provided with vertically oriented hook formations by which it can be detachably engaged by relative vertical movement with openings in the said upright member, said bracket having vertical slots which are selectively engageable by parts of the clip device, the said hook formations being provided on a first wall part of said bracket and the said slots being provided in a second wall part of said bracket, said first and second wall parts of said bracket being oriented at right angles to each other and being so disposed as to be mutually unobstructive, the said hook formations extending from said first wall part of said bracket at right angles to said first wall part in a plane parallel to the plane of said second wall part of the bracket, said hook formations extending from said first wall part in spaced relation to said second wall part at positions that are not located opposite to the slots in the second wall part of said bracket, and the said second wall part of said bracket having a distancing abutment in the form of a return flange on the edge of said second wall part remote from said first wall part, said return flange extending from said edge of said second wall part toward said first wall part in a plane that is parallel to and spaced from said second wall part, the spacing between said return flange and said second wall part being sufficient to receive said parts of the clip device and being less than the spacing between said hook formations and said second wall part.

2. Connection means according to claim 1 wherein said hook formations engageable with the upright member include at least one said formation with a downwardly directed tongue, and at least one said formation with an upwardly directed tongue.

3. Connection means according to claim 1 wherein the said hook formations engageable with the upright member comprise hooks of tapered shape engageable with openings in said upright member with a wedging action.

* * * * *